US012290030B2

(12) United States Patent
Merrick

(10) Patent No.: US 12,290,030 B2
(45) Date of Patent: May 6, 2025

(54) SELF-ALIGNING PRUNING DEVICE

(71) Applicant: Jeremy Merrick, Concord, NC (US)

(72) Inventor: Jeremy Merrick, Concord, NC (US)

( * ) Notice: Subject to any disclaimer, the term of this patent is extended or adjusted under 35 U.S.C. 154(b) by 228 days.

(21) Appl. No.: 17/862,875

(22) Filed: Jul. 12, 2022

(65) Prior Publication Data
US 2023/0016831 A1 Jan. 19, 2023

Related U.S. Application Data

(60) Provisional application No. 63/222,006, filed on Jul. 15, 2021.

(51) Int. Cl.
*A01G 23/095* (2006.01)
*A01G 3/08* (2006.01)
*B64D 1/22* (2006.01)
*B64U 10/14* (2023.01)
*B64U 101/40* (2023.01)

(52) U.S. Cl.
CPC ............ *A01G 23/095* (2013.01); *B64U 10/14* (2023.01); *B64U 2101/40* (2023.01)

(58) Field of Classification Search
CPC ...... A01G 23/095; A01G 3/085; B64C 39/02; B64U 2101/00; B64U 2101/40; B64U 10/14; B64D 1/22
See application file for complete search history.

(56) References Cited

U.S. PATENT DOCUMENTS

| 2014/0096401 | A1* | 4/2014 | Prohaska | B27B 9/00 |
| | | | | 30/379.5 |
| 2022/0174880 | A1* | 6/2022 | Robinson | B64D 1/22 |
| 2022/0174932 | A1* | 6/2022 | Ravanat | A01G 3/088 |

* cited by examiner

Primary Examiner — Mohammed S. Alawadi
(74) Attorney, Agent, or Firm — Shumaker, Loop & Kendrick, LLP; Jonathan M. Hines

(57) ABSTRACT

The present invention provides an apparatus for self-aligning pruning of trees. The apparatus includes a frame and a cutting tool that is attached to the frame. A power supply is connected to the cutting tool and there is a means for controlling the power supply. A support apparatus such as an Unmanned Aerial Vehicle is attached to the frame. The support apparatus can be controlled remotely such that it can position the frame horizontally and vertically. The frame includes at least one guide leg that is angled down and away from the cutting tool and the frame is connected to the support apparatus such that the frame can rotate relative to the support structure in the horizontal plane.

15 Claims, 8 Drawing Sheets

SELF-ALIGNING PRUNING DEVICE

BACKGROUND OF THE INVENTION

This invention relates generally to a cutting tool and more specifically to a tool that is suspended from an unmanned aerial vehicle (UAV), i.e., a drone or other elevated device, used for remotely cutting objects and/or pruning trees or other plants that are spaced away from an operator such that they are difficult to access.

Pruning and cutting tools such as chain saws, handsaws, and loppers generally require an operator to be in close proximity to the object being cut. Often, access to the object being cut is impossible for person without additional tools either because the object to be cut is very high and/or the tree or limb is too small and/or otherwise unsafe to be climbed. Typically, access to the object being cut can be achieved by a ladder, scaffolding, a bucket truck or other heavy equipment. If the object to be cut cannot be accessed in such a manner because of close proximity to houses, buildings, etc. then other methods for reaching these areas are used including mounted pruning and cutting tools for accessing objects to be cut are known. It is also known to have cutting tools such as saws suspended from manned aircraft such as helicopters by cables the ropes.

One problem with pole mounted tools is that the plane the cutting device operates in is fixed relative to the pole. Therefore, the operator must operate the pole such that it is aligned with plane to be cut. This is not possible in some cases where intervening objects between the object to be cut and the operator exist.

Another problem with pole mounted tools is that the reach of the pole is constrained by practical effects such as the length of the pole and its weight.

A problem with tools suspended from cables or ropes and from aircraft in particular is that precise cutting is very difficult if not impossible. Conventional tools suspended in such a manner have general cutting capabilities are not configured to cut in targeted areas.

SUMMARY OF THE INVENTION

The present invention addresses these and other problems by providing a cutting device configured to function remotely from an operator and including structure configured to align a cutting head or tool with the object to be cut and to provide attachment to support elements such as a cable or rope suspended from an autonomous flying vehicle such as a drone, a scaffolding, pole, or other support structure. The attachment is configured such that the device is movable relative to the support structure. In addition, the device is self-aligning relative to the object to be cut.

BRIEF DESCRIPTION OF THE DRAWINGS

The invention may be best understood by reference to the following description taken in conjunction with the accompanying drawing figures in which.

DETAILED DESCRIPTION OF THE INVENTION

Figure 1:
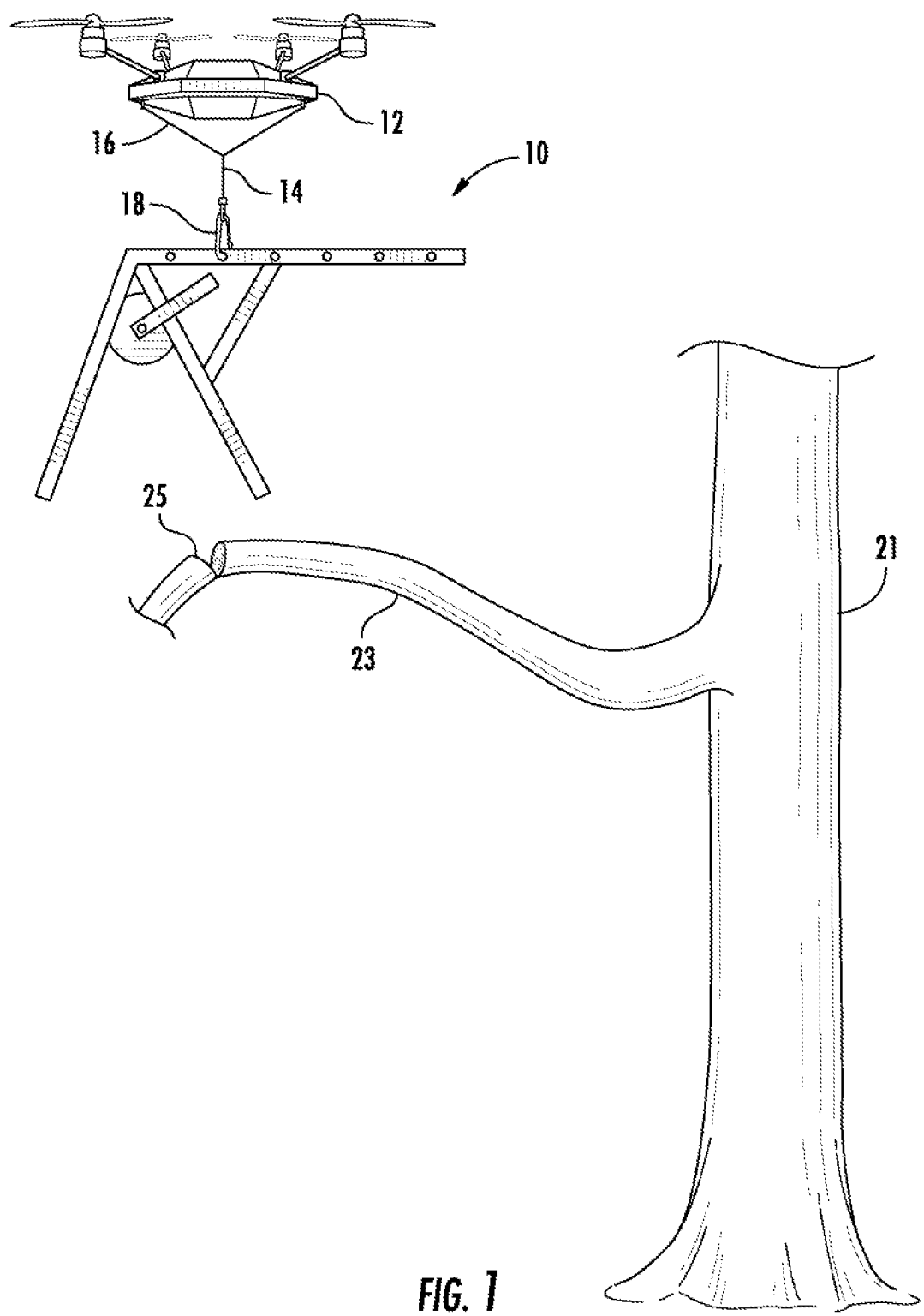
FIG. 1 shows a side view a device according to present invention being supported by a drone near a tree with a sawn branch.

The technology disclosed herein provides a cutting tool for a self-aligning cutting tool 10 for cutting objects and plants remotely from an operator. As shown in FIG. 1 the cutting tool 10 is suspended from an unmanned aerial vehicle (UAV) 12 by a rope 14 which is attached to the UAV 12 by a bridal 16 and to the cutting tool 10 by a shackle 18. It should be appreciated that the cutting tool 10 could also be suspended from other structures such as scaffolding, a ladder, a crane, a pole and a combination thereof. FIG. 1 shows a tree 21 having a branch 23 that has recently been trimmed at cut 25 by the cutting tool 10.

Figure 2:
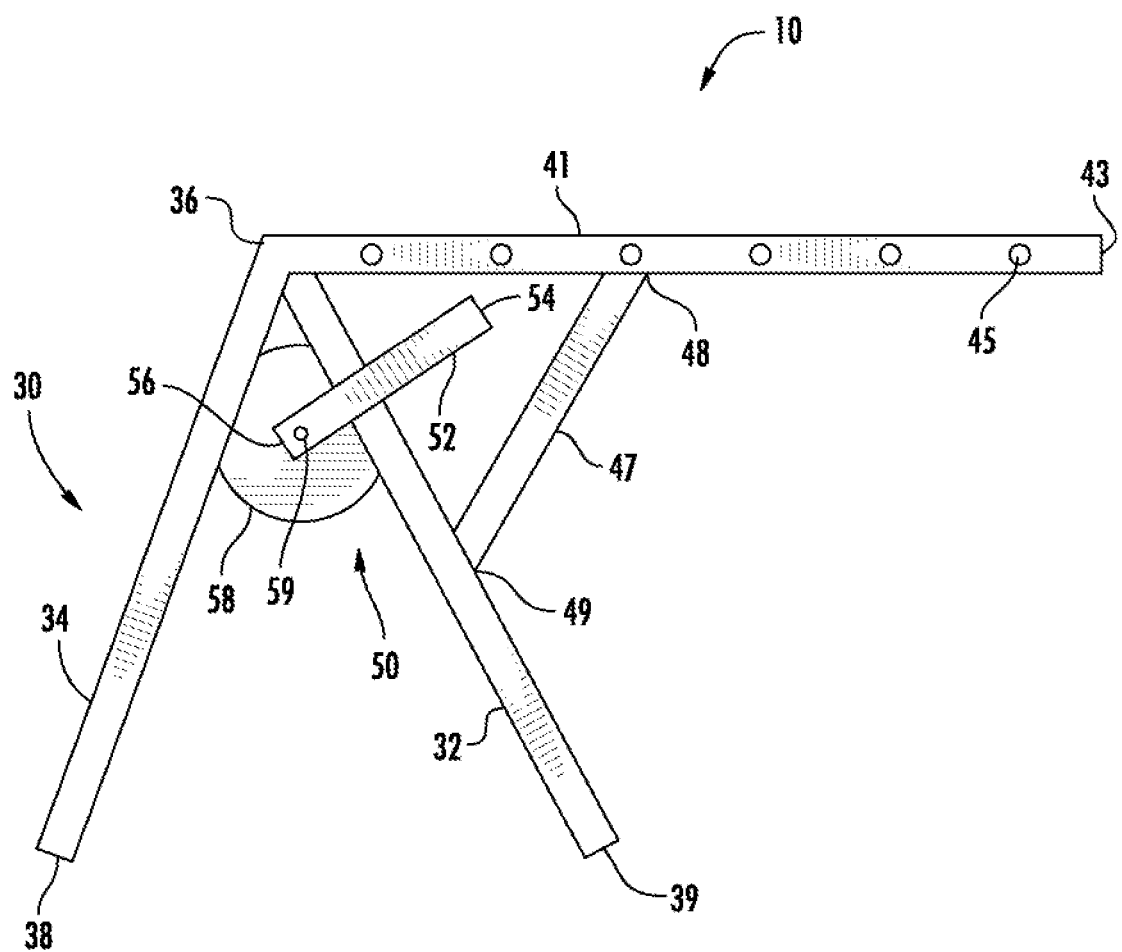
FIG. 2 shows a front view of the device of FIG. 1.
Figure 3:
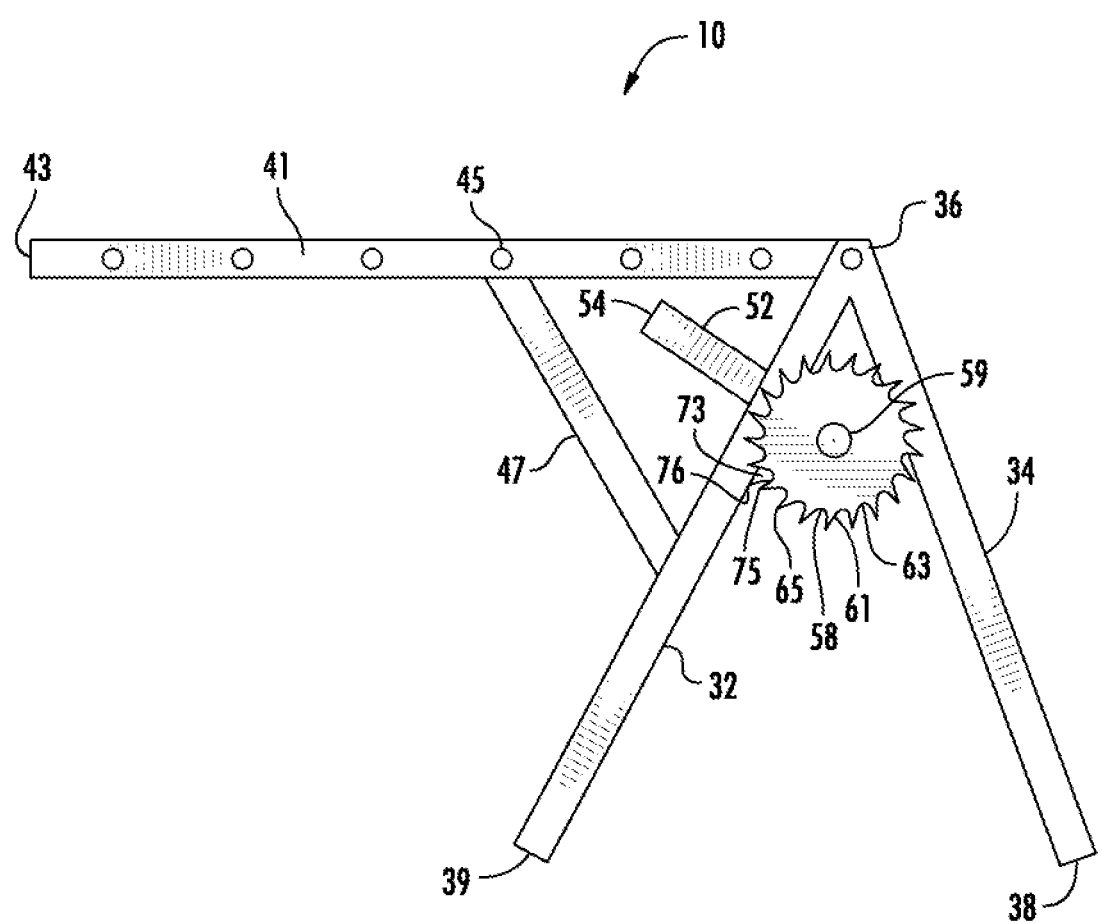
FIG. 3 shows a back view of the device of FIG. 1.

Referring now to FIGS. 2 and 3, there is, respectively, shown a front view and back view of the cutting tool 10. The cutting tool 10 includes a frame 30. The frame 30 includes a first leg 32 and a second leg 34 that are joined together at a vertex 36. The first and second legs 32 and 34 extend to ends 38 and 39 respectively and define an alignment guide. In another embodiment, bolt on or otherwise attachable extensions are provided for the first leg 32 and the second leg 34. In these embodiments the ultimate length of the first leg 32 and the second leg 34 can be chosen such that the best combination of maneuverability and weight with large operating capacity can be obtained. As an alignment guide, first leg 32 and second leg 34 are configured to contact an object to be cut such as branch 23 as the cutting tool 10 is lowered toward the object from above. A saw 50 is attached to the second leg 34 of the frame 30. The saw 50 includes a motor 52 that extends from a first end 54 to a second end 56 and a blade 58. The blade 58 is drivingly attached to the motor 52 by a shaft 59. The shaft 59 extends from near the end 56 of the motor 52.

According to the illustrated embodiment, the blade 58 is circular includes serrated teeth radially disposed about the perimeter and the saw 50 is a circular saw as is commonly known. It should be appreciated that in other embodiments, the saw 50 could be a reciprocating saw, a chainsaw, or cutting tools such as a shear or lopper.

It should be appreciated that the motor 50 can be any motor that is sufficiently light and powerful. In the illustrated embodiment motor is an air motor powered by an air source (not shown). It should be appreciated that the motor can be battery-powered, plug-in electric, internal combustion engine, or other motor that is configured to be controlled remotely by an operator.

According to the illustrated embodiment, the motor is controlled by foot activated switch designed to allow airflow to the motor. As a safety feature, if the operator removes pressure from the foot activated switch, the saw will cease operation. Thus, operation of the cutting tool 10 requires direct attention by the operator and if the operator is injured or distracted such that pressure is removed from the foot activated switch, the cutting tool 10 will shut down. In another embodiment, the cutting tool 10 is controlled remotely via a solenoid and momentary switch via a transmitter.

The frame 30 also includes a balancing bar 41. The balancing bar 41 extends from one end that is attached to vertex 36 of the frame 30 to a distal end 43. A plurality of holes 45 are arrayed along the balancing bar 41 between the vertex 36 and the distal end 43. The plurality of holes 45 are configured to act as attachment points. The plurality of holes 45 are positioned such that a single hole 45 can be chosen that is near enough to the center of gravity of the frame 30 to act as an attachment point such that the frame 30 will generally balance evenly, i.e., a balancing point. In other embodiments, a balancing point is defined by other means either separately or in combination with the plurality of holes 45. By way of example and not limitation, the other and means of defining a balancing point include: notches on the underside of the balancing bar 41, a repositionable attachment clamp that can be positioned at a point along the length of the balancing bar 41, and a combination thereof. A brace 47 is attached to the balancing bar 41 at an end 48 and to the second leg 34 at an end 49 of the brace 47. The brace 47 is configured to provide stability and rigidness to the frame 30.

Figure 4:
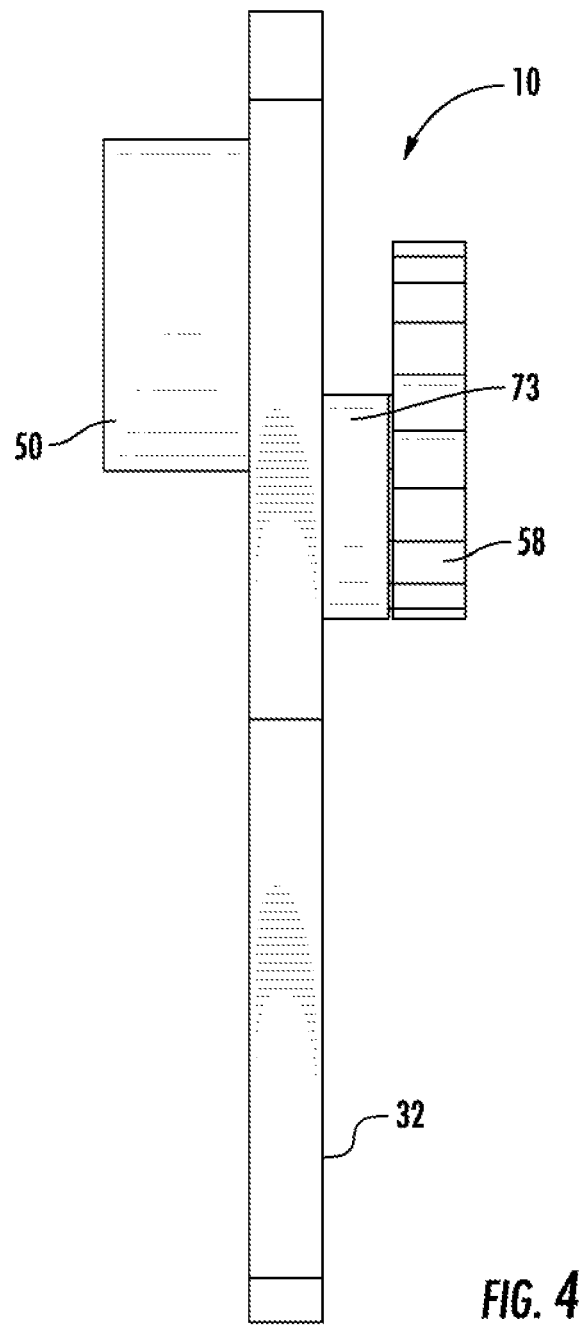
FIG. 4 shows a side view of the device of FIG. 3.

The blade 58 includes a plurality of radially disposed teeth 61 that each extend from a gullet 63 to a tip 65. As can be seen in FIGS. 3 and 4, a guide block 73 is positioned between the blade 58 and the first leg 32. The guide block 73 is operable to prevent items such as twigs and branches and leaves from being caught between the blade 58 and the first leg 32. The guide block 73 can be formed of an abradable material such that clearance between the guide block 73 and the blade 58 can be defined by a run-in period where the action of the blade abrades the guide block 73 as is conventionally known. The guide block 73 defines a surface 75 such that surface 75 and the surface 76 of the first leg 32 act together to prevent items from being carried by the action of the blade around mechanisms of the saw such as the shaft 59.

Figure 5:
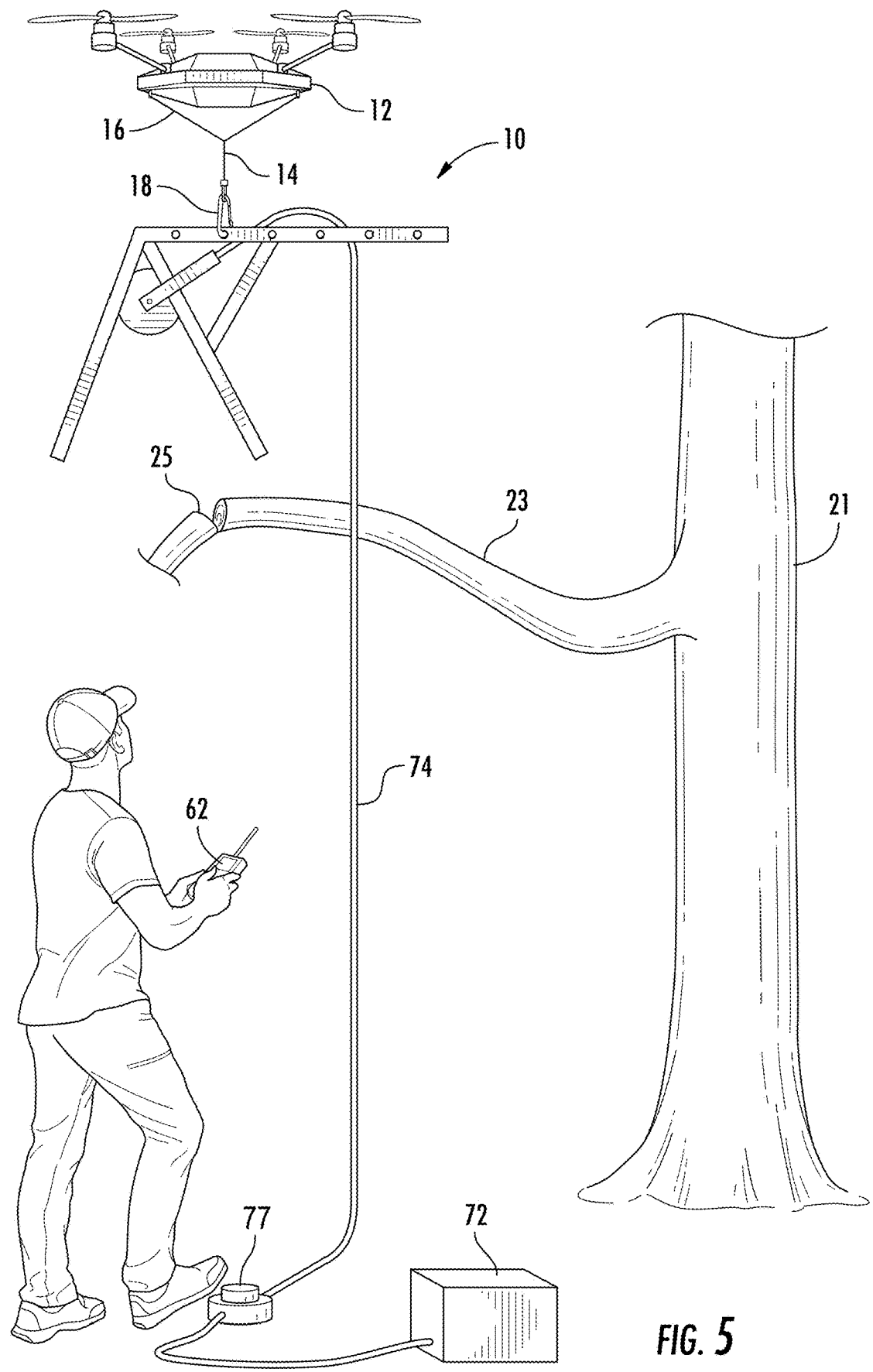
FIG. 5 shows the device of FIG. 1 attached to a pneumatic power supply and being operated

Referring now to FIG. 5, during operation, the cutting tool 10 is attached to the UAV 12 by the rope 14 as described above and the motor 50 is connected to a power supply as necessary to be ready to be activated. The motor 50 can be an internal combustion motor, a battery-operated motor, an electric motor powered by electricity transmitted through an attached cord, or other means for providing power to cutting tool 10 According to the illustrated embodiment, the motor 50 is pneumatically air-powered and as such is connected to a source of pressurized air 72 as is generally known. A pneumatic line 74 is attached to motor 50 and is configured to hang down from the cutting tool 10 to a foot operated switch 77 accessible to the operator. In this regard, cutting tool 10 is fluidly connected to the source of pressurized air 72. It should be appreciated that the total amount of pneumatic hoses suspended by the UAV 12 depends upon the operational altitude, and thus the effective distance of the motor 50 from the ground. This affects the total weight supported by the UAV 12 and affects the center of gravity of the frame 30. The shackle 18 is engaged to an attachment hole 45 chosen to be in line with the center of gravity of the frame 30.

Figure 6:
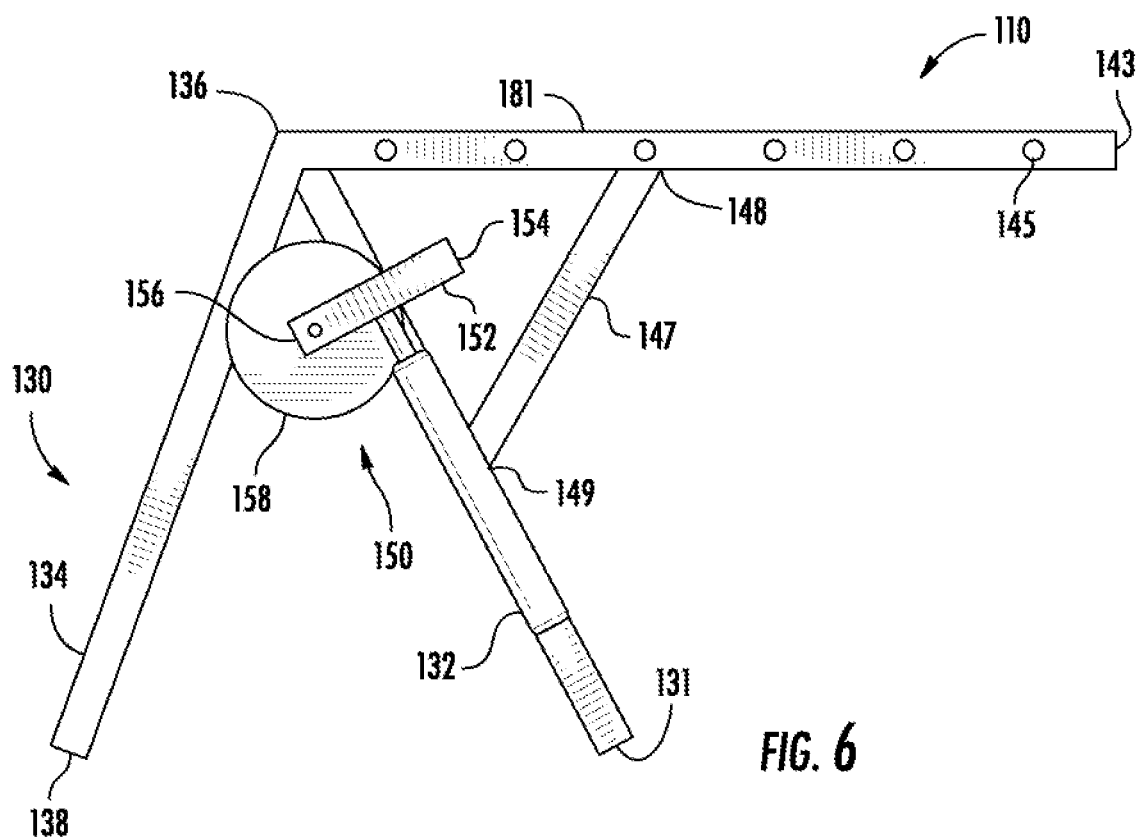
FIG. 6 shows a side view of an alternative embodiment of the device of FIG. 1 that includes an actuator for moving a cutting here relative to a frame.
Figure 7:
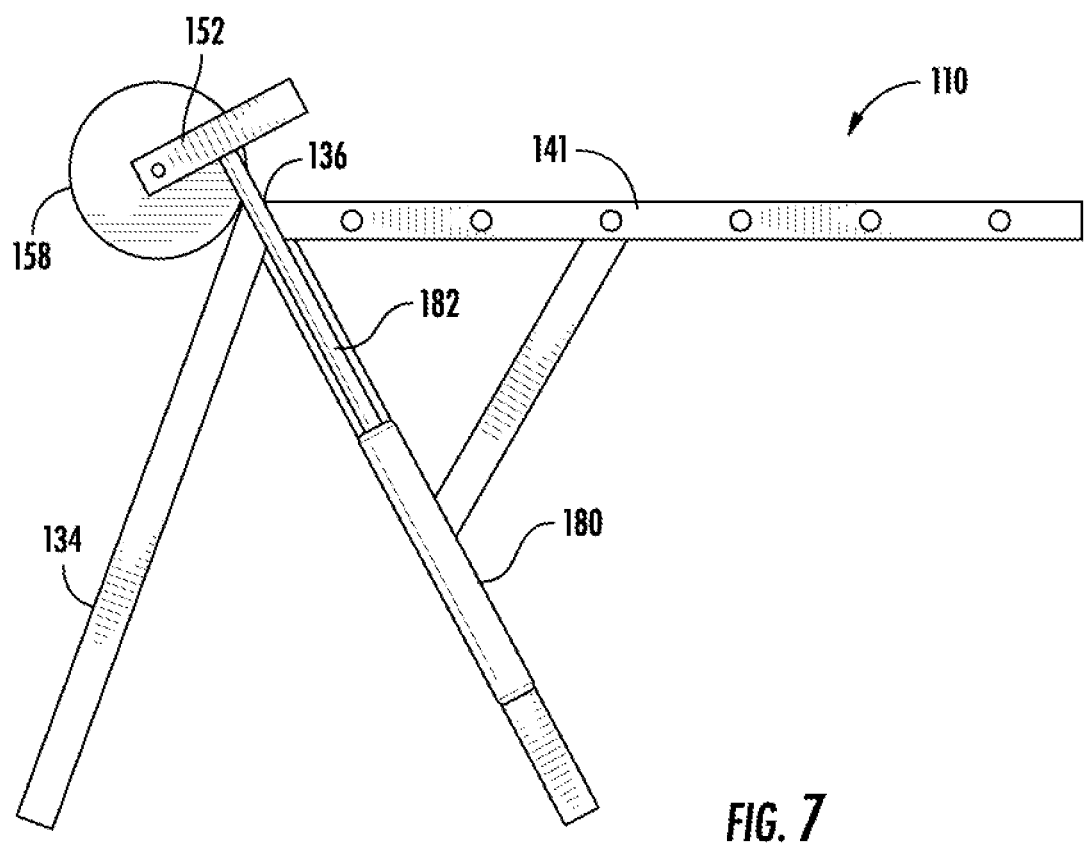
FIG. 7 shows another side view of the alternative embodiment shown in FIG. 6.

Referring now to FIGS. 6 and 7, an alternative embodiment of the above-described technology is shown which provides a cutting implement which can be moved between a first position and a second position relative to the frame as will be further described. The alternative embodiment is shown with reference numbers in the 100 series and like elements the primary embodiment and they are turned embodiment are associated with similar reference numbers.

There is provided a cutting tool 110 that includes a frame 130. The frame 130 includes a first leg 132 and a second leg 134 that are joined together at a vertex 136 and extend to ends 38 and 39 respectively. A saw 150 is attached to the second leg 134 of the frame 130. The saw 150 includes a motor 152 that extends from a first end 154 to a second end 156 and a blade 158.

The frame 130 also includes a balancing bar 141. The balancing bar 141 extends from one end that is attached to vertex 136 of the frame 130 to a distal end 143. A plurality of holes 145 are arrayed along the balancing bar 141 between the vertex 136 and the distal end 143. The plurality of holes 145 are configured to act as attachment points. The plurality of holes 145 are positioned such that a single hole 145 can be chosen that is near enough to the center of gravity of the frame 130 to act as an attachment point such that the frame 130 will generally balance evenly, i.e., a balancing point. A brace 147 is attached to the balancing bar 141 at an end 148 and to the second leg 134 at an end 149 of the brace 147. The brace 147 is configured to provide stability and rigidness to the frame 130.

According to the above-described alternative embodiment, there is provided a pneumatic cylinder 180 that includes an extendable shaft 182. The shaft 182 is attached to the motor 152 of the saw 150. The pneumatic cylinder 180 is operable to move the between a first position as shown in FIG. 7 and a second position as shown in FIG. 6. In this regard, the saw 150 can be moved from a position clear of a limb to be cut in the first position to the second position during which transition activation of the saw would cause the limb to be cut. An advantage of this alternative embodiment is that the saw 150 can be mechanically driven through an item to be cut without reliance on gravity.

Figure 8:
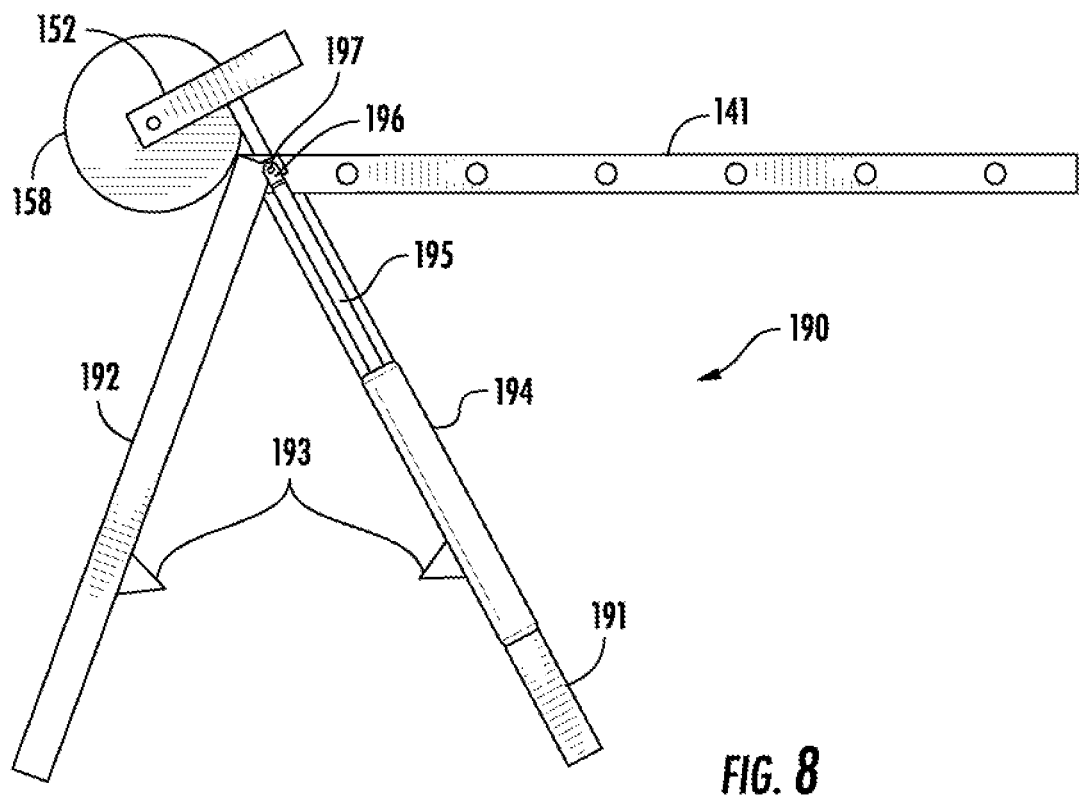
FIG. 8 shows a side view of another alternative embodiment of the device of FIG. 1 that includes a grapple.
Figure 9:
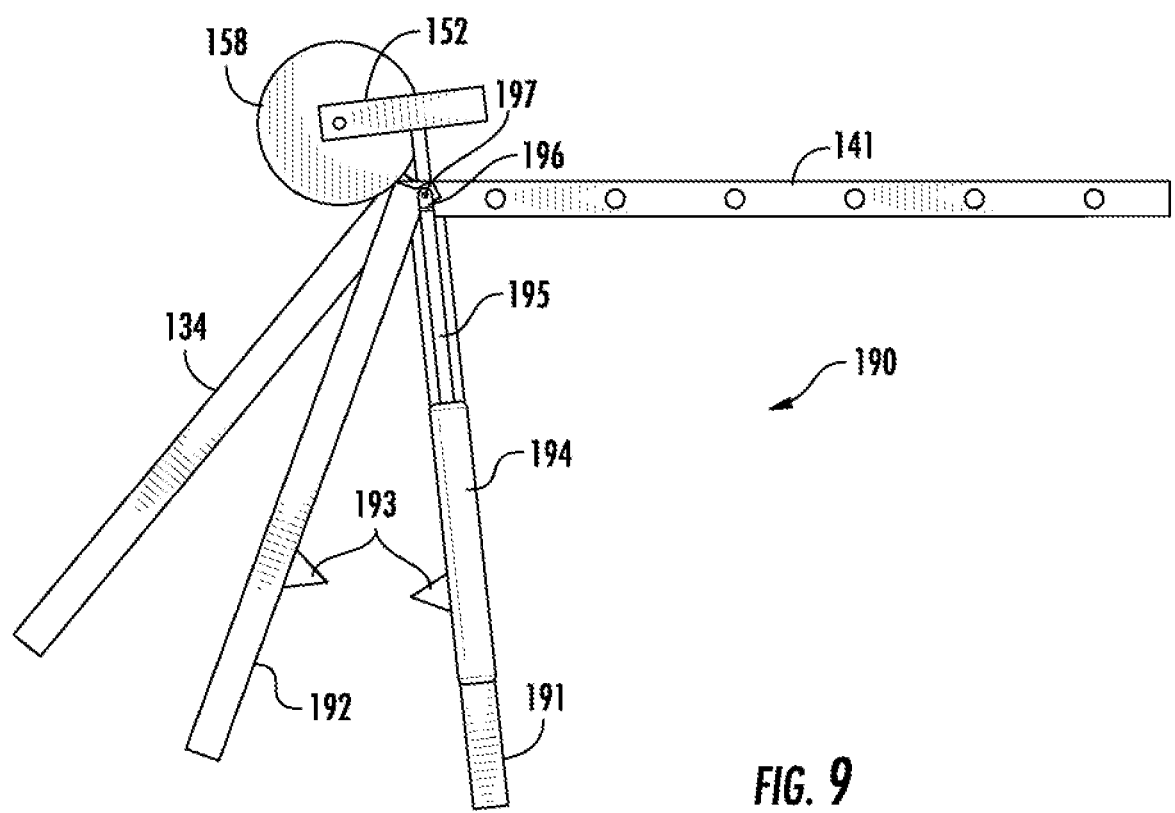
FIG. 9 shows another side view of the alternative embodiment shown in FIG. 8.
Figure 10:
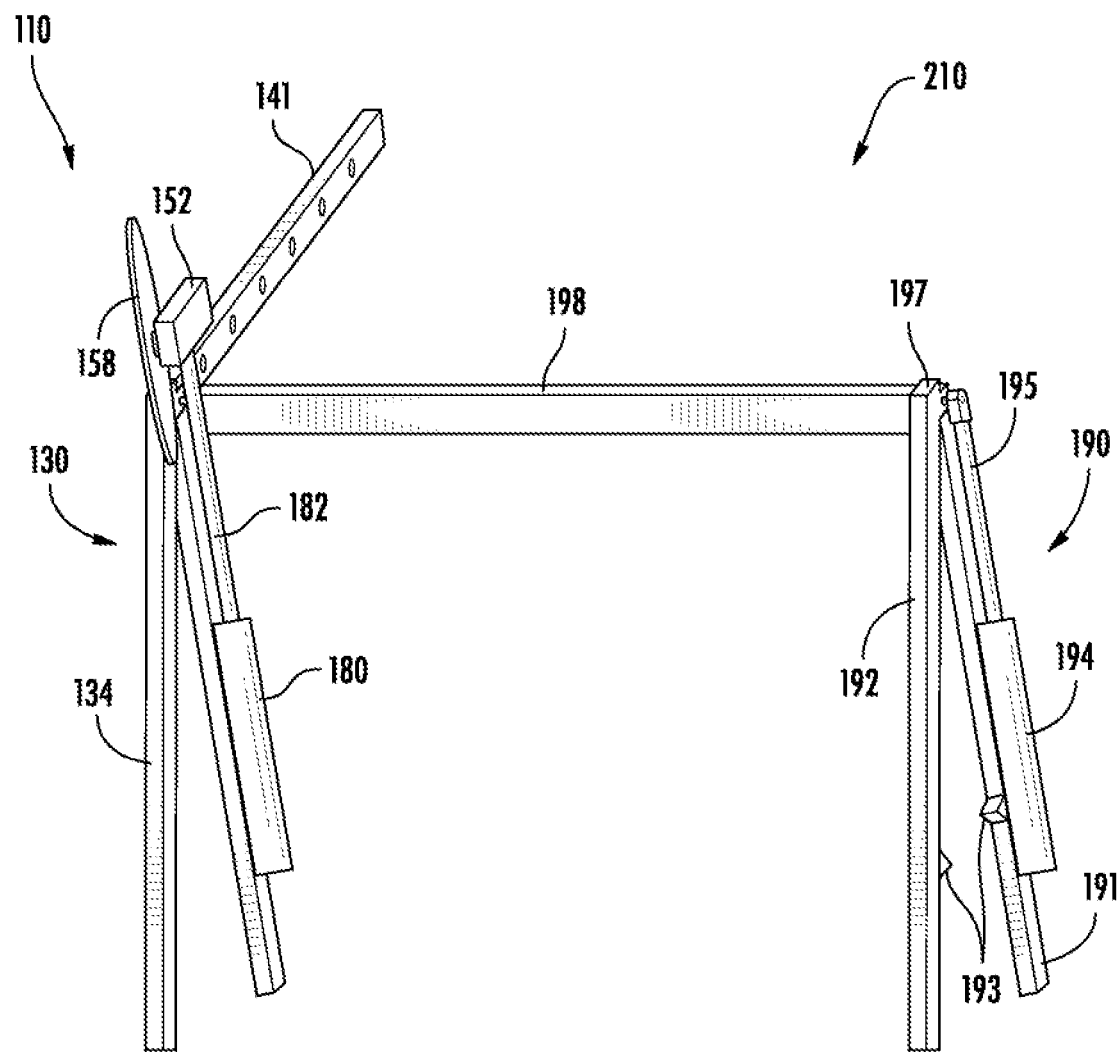
FIG. 10 shows a side view of an alternative embodiment that includes the alternative embodiments shown in FIG. 6 and FIG. 8 which includes a movable cutting head and a grapple.

Referring now to FIGS. 8-10, there is shown another alternative embodiment in which a cutting tool 210 is provided that includes a clamp 190. The clamp 190 is attached to a frame 130 of the cutting tool 110 as described above by a bar 198. It should be appreciated that the attachment can be configured such that each of the clamp 190, the frame 130 and the bar 198 are movable relative to one or both of the other two components. The clamp 190 includes a first leg 191 and a second leg 192 that are attached to each other at a hinged connection 197.

A pneumatic cylinder 194 is attached to the first leg 191 and includes a shaft 195 that extends to a lever 196 that is attached to the second leg 192. The pneumatic cylinder 194 and the first leg 191 and the second leg 192 are configured such that the second leg 192 is movable relative to the first leg 191 by action of the pneumatic cylinder 194. The second leg is thus movable between an open first position as shown in FIG. 8 and a closed second position as shown in FIG. 9.

The first leg 191 and the second leg 192 each include at least one spike 193 attached opposing sides of the first leg 191 and the second leg 192 respectively. When the clamp 190 is in the open first position, space between the first leg 191 and the second leg 192 is sufficient to surround a limb to be cut. When the clamp 190 is positioned around such a limb he can be moved toward the closed second position such that the limb is gripped between the first leg 191 and the second leg 192 with the aid of the spikes 193.

It should be appreciated that pneumatic cylinders 180 and 194 our actuators and in other embodiments the actuators can be electrical motors, servomotors or other devices to affect the operation of the pneumatic cylinders 181 and 194 as described above. The pneumatic cylinders 180 and 194 are connected to sources of pressurized air (not shown).

It should be appreciated that operation of the clamp 190 in conjunction with the cutting implement 110 provides a method for securing the position of the cutting implement 110 relative to a limb to be cut.

The technology described herein can be better understood by description of the operation thereof. Referring now to FIG. 1, in a first step of operating, rope 14 is attached to the UAV 12. A weight such as a sandbag is attached to rope 14 via shackle 18. In this regard, the cutting tool 10 is not attached to the UAV 12 so that the UAV 12 can be positioned and the rope 14 which shackle 18 lowered through the tree canopy without problems caused by disturbance of air from the rotors or difficulty passing the cutting tool 10 through the upper canopy.

The UAV 12 is operated via a controller 62 such that it lifts itself and the cutting tool 10. In a second, flying step, UAV 12 is operated to fly above the branch to be cut. The rope 14 is lowered such that the sandbag on shackle 18 passes through the canopy down to the ground where the sandbag is replaced with the cutting tool 10. The rope 14 and the flying UAV 12 are positioned as necessary such that the cutting tool 10 is positioned over the branch 23 to be cut and the branch 23 is between the ends 38 of the first leg 32 and the end 39 of the second leg 34. As the UAV lowers an altitude, the device 10 lowers and the legs 32 and 34 operate to guide the cutting tool 10 such that the saw blade 58 is eventually aligned with the branch 23.

The saw blade 58 is activated by the operator. Then the cutting tool 10 is lowered such that the saw blade 58 contacts the branch. According to the illustrated embodiment, the cutting tool 10 is lowered by changing the position of the UAV 12. In other embodiments, the cutting tool to is lowered by extending the rope 14. As the cutting tool 10 is lowered is positioned such that the first leg 32 and a second leg 34 bracket the branch 23. In this regard, branch 23 is between the first leg 32 and the second leg 34. The angled orientation of the first leg 32 and the second leg 34 act such that contact between the first leg 32 and/or the second leg 34 and the branch 23 to guide the branch 23 toward and eventually into contact with the saw blade 58. In a preferred operation, the saw blade 58 is activated by the operator prior to contacting the branch such that the saw blade 58 has adequate momentum to cleanly cut the branch 23 upon contact. If the action of the saw blade 58 pulls the branch 23 into such close contact with the cutting tool 10 the guide to block 73 act to prevent jamming of the saw blade 58 or other impediment to the operation of the cutting tool 10.

Small limbs and branches or leaves might be pushed by action of the saw blade to the side instead of being cut due to their flexibility and mobility relative to the saw blade. The guide block 73 acts to prevent such debris from becoming lodged or jammed between the saw blade 58 and the second leg 34.

The alternative embodiments described above can be better understood by a description of the operation thereof. The clamp 190 is positioned in the open, first position. The cutting tool 110 with the attached clamp 190 is lowered such that the clamp 190 contacts the branch or other object to be cut and the frame 130 is positioned as desired. The clamp 190 is activated such that it moves from the open first position toward the closed second position until the clamp 190 is firmly engaged with the branch or other object to be cut and the frame 130 is thus positioned as desired. The saw 150 is activated and then the pneumatic cylinder is operated to move the saw between the first position toward the second position as the saw 150 is active. In this manner, the branch or other object to be cut is cut.

To summarize its operation, the UAV 12 is typically be operated above the tree canopy, so that it does not get caught in any branches, and the wind from the rotors will not blow the branch trying to be cut around in a manner that would make it difficult to cut. In this regard, The UAV 12 will fly the rope above the tree and lower the rope down through the canopy via a sandbag or sufficient weight, then the cutting tool 10 will be attached and raised up to the desired limb to be cut.

The method and apparatus described herein has several advantages over the prior art. In particular, it eliminates problems associated with precisely trimming individual remote objects, such as tree branches. The method and apparatus described herein also allow an economical and first time access to tree maintenance that was otherwise prohibited by either cost or means or both.

The foregoing has described an apparatus for a remotely trimming a predetermined portion such as a branch of a tree or other object. All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

What is claimed is:

1. An apparatus for self-aligning pruning of trees, the apparatus comprising:
   a saw;
   a motor for driving the saw by a shaft;
   a support apparatus for the saw;
   an alignment guide; and
   wherein the alignment guide includes a first leg that is angled down and away from the saw and the saw is connected to the support apparatus such that the saw can rotate relative to the support structure in a horizontal plane; and
   wherein a second leg is positioned such that together the first leg and the second leg define the alignment guide, the alignment guide is in a V-shape, the saw is located near an apex of the V, and the shaft is disposed between the first and the second legs.

2. The apparatus according to claim 1, wherein the saw is attached to a frame.

3. The apparatus according to claim 2, wherein the support apparatus is an Unmanned Aerial Vehicle and the frame is attached to the unmanned aerial vehicle.

4. The apparatus according to claim 2, further comprising a means for controlling the support apparatus that is configured for positioning the frame horizontally and that is configured for positioning the frame vertically.

5. The apparatus according to claim 2, wherein the frame includes a balancing bar.

6. The apparatus according to claim 5, wherein a plurality of holes is defined through the balancing bar.

7. The apparatus according to claim 1, wherein the motor is an air motor.

8. The apparatus according to claim 1, further comprising an abradable guide block that is operable together with the first leg to prevent items from being carried around the shaft of the saw by action of the blade.

9. The apparatus according to claim 1, wherein the saw is movable between a first position and a second position.

10. The apparatus according to claim 9, further comprising a clamp that is operable to move between a first open position and a second closed position.

11. An apparatus for self-aligning pruning of trees, the apparatus comprising:
- a frame;
- a saw that is attached to the frame;
- the saw comprising:
  - a motor;
  - a blade mounted on a shaft;
  - a power supply connected to the cutting tool;
- a means for controlling the power supply;
- a support apparatus for supporting the frame, wherein the support apparatus is an Unmanned Aerial Vehicle;
- a means for positioning the support apparatus comprising:
  - means for positioning the frame horizontally;
  - means for positioning the frame vertically;
- a balancing bar;
- a plurality of holes defined through the balancing bar;
- a first leg that is angled down and away from the cutting tool and the frame is connected to the support apparatus such that the frame can rotate relative to the support structure in a horizontal plane;
- a second leg positioned such that together the first leg and the second leg define a V-shaped guide wherein the saw is located near an apex of the V, and the shaft is disposed between the first leg and the second leg; and
- an abradable guide block positioned near the saw that is operable together with the first leg to prevent items from being carried by around the shaft of the saw by action of the blade.

12. The apparatus according to claim 11, wherein the saw is movable between a first position and a second position.

13. The apparatus according to claim 12, a clamp that is operable to move between a first open position and a second closed position.

14. A method for operating an apparatus for self-aligning pruning, the apparatus having: a saw mounted on a shaft; a means for activating the saw; a support apparatus for the saw; an alignment guide; and wherein the alignment guide includes a first leg that is angled down and away from the saw and a second leg is positioned such that together the first leg and the second leg define the alignment guide, the alignment guide is in a V-shape, the saw is located near an apex of the V, and the shaft is disposed between the first leg and the second leg and the saw is connected to the support apparatus such that the saw can rotate relative to the support structure in a horizontal plane, the method comprising:
- attaching the apparatus to a UAV,
- flying the UAV such that the apparatus is above an object to be cut;
- operating the saw;
- lowering the apparatus such that the object to be cut is within the alignment guide,
- continuing to lower the apparatus such that the operating saw engages the object to be cut; and
- cutting the object to be cut.

15. The method according to claim 14 wherein the apparatus for self-aligning pruning includes a clamp that is movable between a first position and a second position and the saw is configured to be movable between a first position and a second position wherein the step of lowering the apparatus includes:
- engaging the object to be cut with the clamp;
- closing the clamp such that the object to be cut is captured within the clamp; and
- the step of cutting the object to be cut includes the steps of:
- activating the saw;
- moving the saw from the first position toward the second position thereby cutting the object to be cut.

* * * * *